Sept. 10, 1957 N. GEERTSEN 2,805,754
CAN BODY RESPACING MECHANISM
Filed April 16, 1954 3 Sheets-Sheet 3
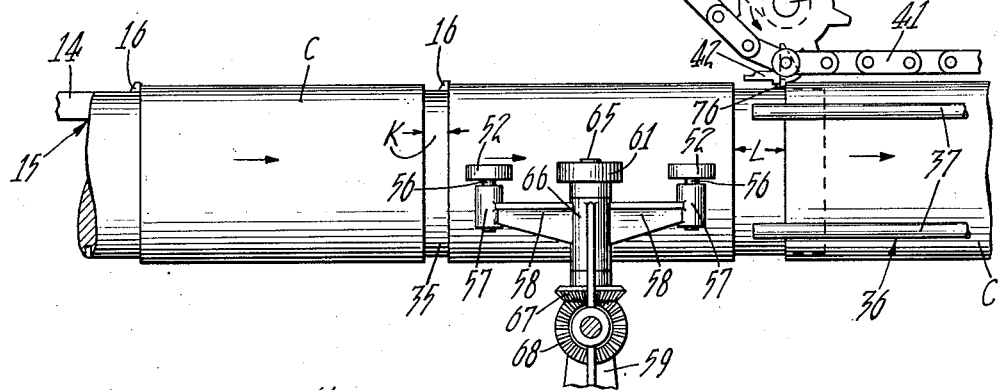
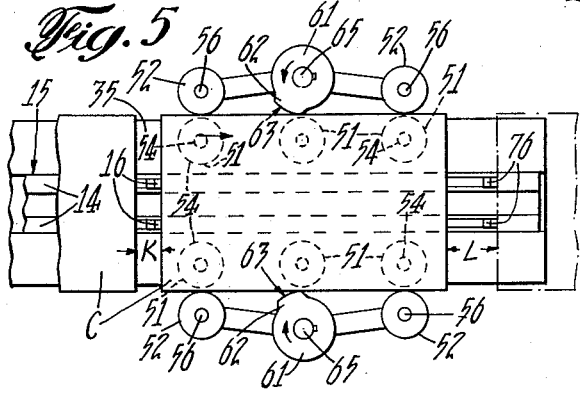
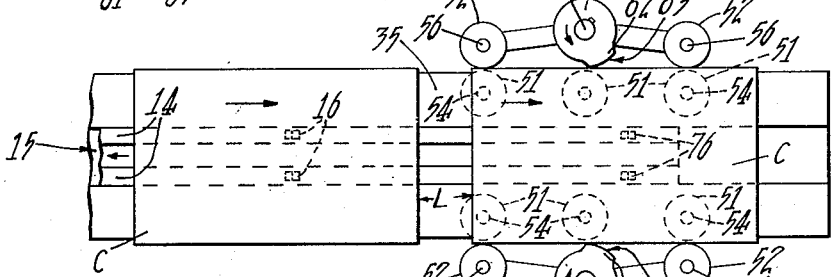
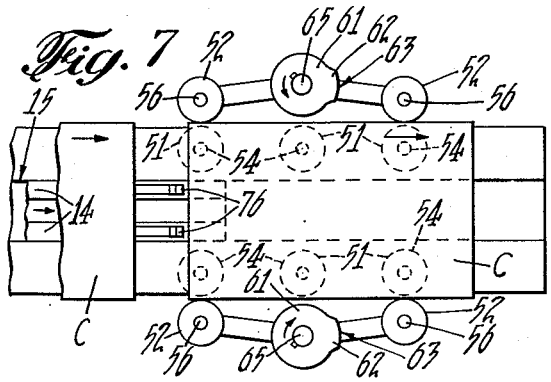
INVENTOR.
NELSON GEERTSEN
BY *Charles H. Gurne*
*Leland R. McCann*
*George W. Reiber*
ATTORNEYS

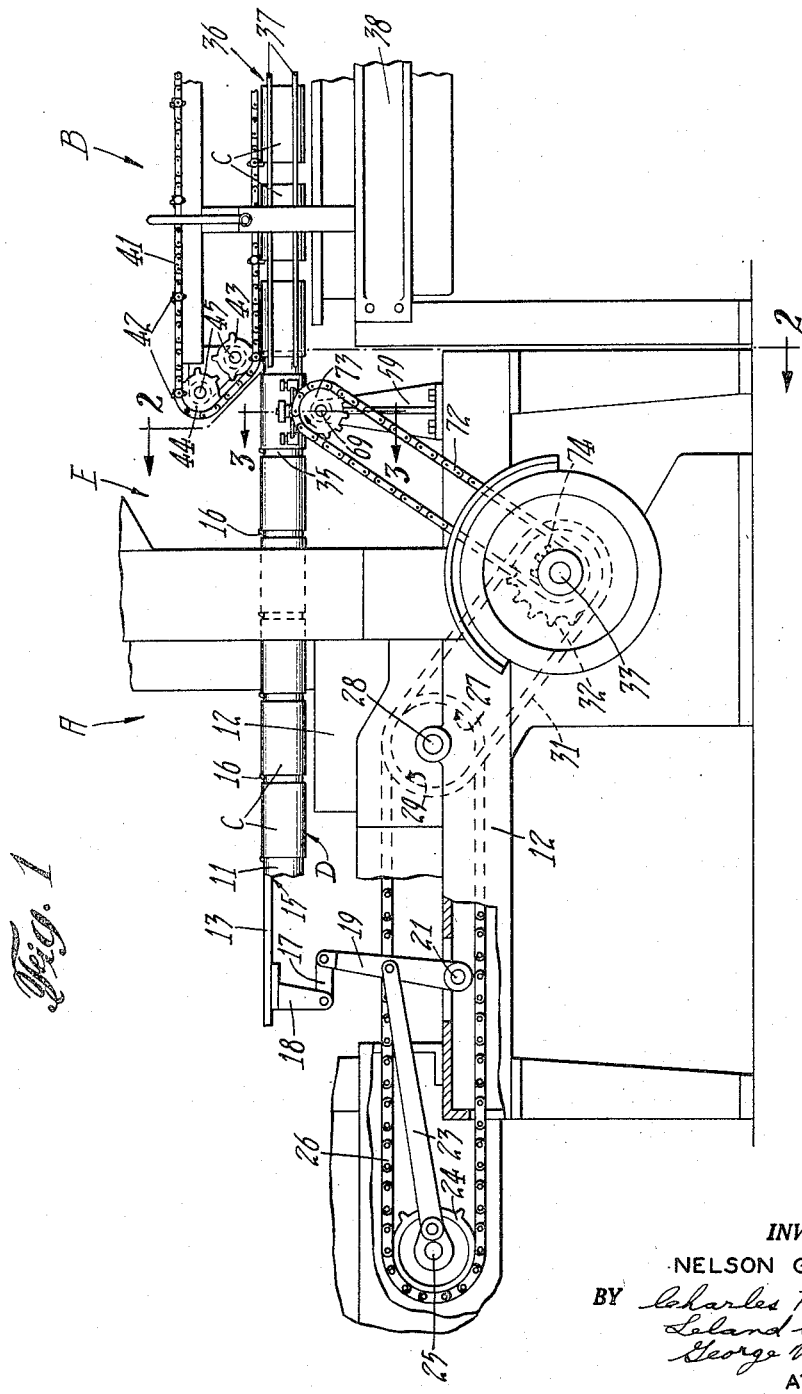

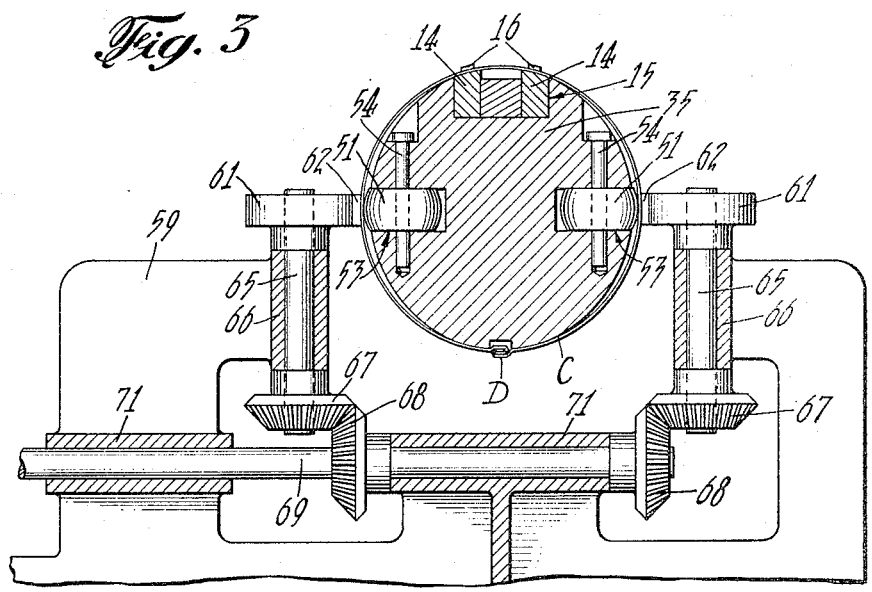
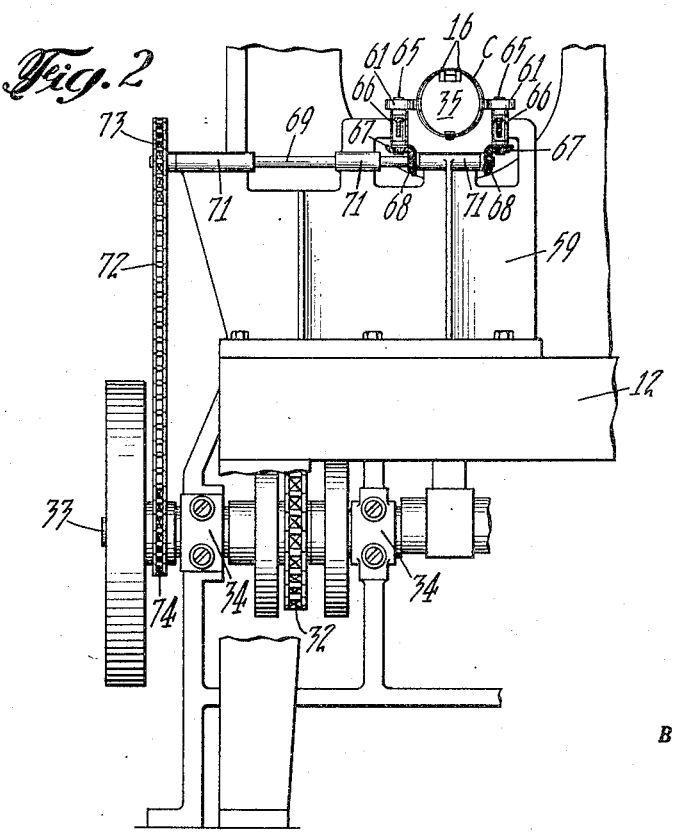

United States Patent Office 2,805,754
Patented Sept. 10, 1957

2,805,754

CAN BODY RESPACING MECHANISM

Nelson Geertsen, Oak Park, Ill., assignor to American Can Company, New York, N. Y., a corporation of New Jersey Application April 16, 1954, Serial No. 423,765

6 Claims. (Cl. 198—34)

The present invention relates to machines for making sheet metal can bodies in which the bodies are propelled in timed and spaced order along a predetermined path of travel and has particular reference to improved roller devices for respacing the moving bodies for subsequent operations without disturbing their timed relation.

In the manufacture of sheet metal can bodies, certain machines such as bodymakers with side seam soldering attachments, are utilized without substantial change to produce can bodies of the same diameter but of various lengths within a predetermined range. The longest or tallest body the machine will produce is governed by the minimum space required between bodies to properly propel them through the machine. This space in turn is determined by the feeding mechanism of the soldering attachment, which mechanism is provided with gripper fingers that require sufficient space between bodies to enter within the bodies to hold them tight during the soldering operation. This space is considerably greater than that needed for the usual feed dogs utilized in the preceding bodymaker section to propel the bodies.

In order to increase the range of body lengths which can be produced on such a machine, the instant invention provides for producing the greatest length of body that can be accommodated in the bodymaker and further provides for increasing the space between the bodies immediately prior to their transfer from the bodymaker section to the soldering section so as to facilitate gripping of the bodies for advancement therethrough.

An object of the invention is the provision in such a machine of improved roller devices which operate to increase the space between can bodies moving in a procession, without altering the timed relation of the bodies, so that increased variation of body lengths may be produced and properly gripped for a subsequent operation without changing the machine to accommodate longer bodies and without interrupting the processional order of the bodies.

Another object is the provision of such improved roller devices which include a plurality of auxiliary roller supports which support the bodies during the respacing operation to facilitate smooth and easy travel of the bodies through engagement with the exterior faces of the bodies.

Numerous other objects and advantages of the invention will be apparent as it is better understood from the following description, which, taken in connection with the accompanying drawings, discloses a preferred embodiment thereof.

Referring to the drawings:

Figure 1 is a side elevation showing principal parts of a can body making machine embodying the instant invention, the machine including the initial portion of a side seam soldering attachment, parts being broken away and a procession of can bodies being shown passing through the machine;

Fig. 2 is an enlarged transverse section taken substantially along the broken line 2—2 in Fig. 1, with parts broken away;

Fig. 3 is a greatly enlarged transverse section taken substantially along the line 3—3 in Fig. 1, with parts broken away;

Fig. 4 is an enlarged schematic elevation of principal parts of the machine shown in Fig. 1, with parts broken away; and Figs. 5, 6 and 7 are schematic plan views of the parts shown in Fig. 4, the views showing how the space between can bodies in the procession is increased.

As a preferred or exemplary embodiment of the instant invention the drawings illustrate principal parts of a can body making machine A (Fig. 1) with a side seam soldering attachment B of the character disclosed in United States Patent 1,770,041 issued July 8, 1930, to John F. Peters on Roll Bodymaker and United States Patent 1,338,716 issued May 4, 1920, to M. E. Widell on Soldering Machine.

In such a machine, flat blanks of tin plate or the like material are formed into tubular can bodies C having side seams D (Fig. 3) and are then transferred into the soldering attachment B for application of molten solder to the side seams to bond the seam parts together in a hermetic joint. In the bodymaking machine A, the bodies C during formation, are advanced intermittently in timed and equally spaced processional order through the various working stations of the machine. Upon completion of the side seams D, the bodies are respaced at an intermediate or transfer station E (Fig. 1) and are advanced into the soldering attachment B through which they are advanced continuously in timed and equally respaced processional order for the soldering operation.

In the bodymaking machine A, the advancing can bodies C are supported on an inside mandrel or horn 11 (Fig. 1) disposed in a horizontal position and extending longitudinally of a frame 12 which constitutes the main frame of the machine. Intermittent or step-by-step advancement of the bodies C along the horn 11 preferably is effected by a reciprocating feed device which at the entrance end of the horn (at the left as viewed in Fig. 1) comprises a single feed bar 13 and which at the transfer station E branches out into a pair of spaced and parallel feed bars 14 (see Figs. 3 and 5). These feed bars 13, 14 are disposed in and operate in longitudinal grooves 15 formed in the horn. The feed bars 13, 14 carry equally spaced apart spring pressed retractable feed fingers 16 for propelling engagement behind the can bodies.

Reciprocation of the feed bars 13, 14 is effected by a link 17 (Fig. 1) having one end pivotally connected to a lug 18 which depends from the feed bar 13 and having its opposite end pivotally connected to a rocker arm 19 mounted on a pivot pin 21 carried in the frame 12. The arm 19 is rocked on its pivot pin 21 by a connecting rod 23, one end of which is pivotally connected to the arm. The opposite end of the connecting rod 23 is pivotally and eccentrically connected to a sprocket 24 mounted on a cross-shaft 25 journaled in suitable bearings in the frame 12.

Rotation of the sprocket 24 is effected by an endless chain 26 which operates over the sprocket and over an idler sprocket 27 mounted on a shaft 28 journaled in suitable bearings in the frame 12. The idler sprocket 27 is rotated by a second sprocket 29 mounted on the shaft 28 adjacent the sprocket 27 and rotated by an endless chain 31 which is driven by a driving sprocket 32 (see also Fig. 2) mounted on a main drive shaft 33 journaled in bearings 34 in the frame 12. The driving shaft 33 may be rotated in any suitable manner.

At the transfer station E (Fig. 1), the inside forming horn 11 is formed with a reduced diameter supporting horn section 35 (see also Figs. 3 and 4) which terminates adjacent and slightly overlaps the receiving or entrance end of an outside horse 36 which is part of the soldering attachment B of the machine. This horse 36 comprises a plurality of spaced guide bars 37 which surround the can bodies and provide for continued outside guidance of the bodies for the soldering operation. These horse bars 37 are supported in a sub-frame 38.

The can bodies C are propelled through the outside horse 36 by a continuously moving endless chain conveyor 41 having gripper dogs 42 spaced at intervals along the chain and which travel along the top of the horse. The chain conveyor 41 and its gripper dogs 42 constitute a receiving mechanism or conveyor. This receiving conveyor is partially coextensive with and slightly overlaps the delivery or feed bars 14 and picks up the can bodies at the transfer station E and propels them through the soldering attachment.

At the receiving end of the horse 36 the conveyor 41 operates over a pair of vertically spaced idler sprockets 43, 44 (Fig. 1) mounted on shafts 45 journaled in suitable bearings in the sub-frame 38. The conveyor 41 is continuously operated in any suitable manner preferably by a synchronous connection with the bodymaking machine A as disclosed in the above mentioned Widell patent, so that the conveyor operates in timed relation with the feed bars 13, 14 of the bodymaker.

In such an organized apparatus where various forming operations are required to be performed in sequence at stations through which the can bodies C are passed intermittently, the operation of the machine is facilitated by having the advancing bodies spaced apart equally. In the instant machine the reciprocating feed bars 13, 14 having fixed strokes and having their feed fingers 16 equally spaced apart, control the spaced intermittent advancement of the can bodies through the bodymaker for delivery to the soldering attachment. The space between the feed fingers 16 is fixed and is selected to accommodate the longest or highest can body required to be produced on the machine. The longest can body may occupy nearly all the space between the feed fingers, leaving only a minimum space K (see Fig. 4) of, for example, one quarter of an inch between it and the next adjacent body to permit a feed finger 16 to engage against the trailing edge of the body to propel it along the horn 11. Thus, long bodies as well as short bodies of the same diameter may be produced in the machine and advanced along the horn 11 without changing the stroke of the feed bars 13, 14.

The minimum space K between long bodies, however, is not sufficient to permit the gripper dogs 42 of the receiving conveyor 41 to enter between the bodies and properly grip them for the soldering operation as they do with short bodies. To overcome this difficulty, provision is made at the transfer station E to advance each can body C a predetermined distance to increase the space between its trailing edge and the leading edge of the next following can body in the procession. The space is increased to a maximum space L (Fig. 4) of, for example, five eighths of an inch as compared with the minimum quarter inch space K hereinbefore mentioned.

The respacing of the can body C as it traverses the transfer station E is effected immediately following the feeding or forward stroke of the feed bars 13, 14 and while the feed bars are moving back through their return stroke. In order to provide for free easy movement of the body through the transfer station E during this extra advancement of the body, the body is supported on and advances between a plurality of cooperating, freely rotatable inside and outside support rollers 51, 52 (Figs. 3, 4, 5, 6 and 7).

There are three inside rollers 51 located on each side of the reduced diameter support horn section 35 where they bear against the inner surface of the advancing can body. These rollers 51 are disposed in horizontal longitudinal grooves 53 (Fig. 3) formed in the horn section 35, the rollers being mounted on vertical pins 54 secured in the horn section 35 as shown in Fig. 3.

The outside rollers 52 are disposed outside of the horn section 35 where they bear against the outer surface of the advancing can body. There are two of these outside rollers 52 on each side of horn section 35 and they are located directly opposite the first and third inside rollers 51. The outside rollers 52 are mounted on vertical pins 56 which are carried in bosses 57 (Fig. 4) formed on the ends of arms 58 of a bearing bracket 59 (see also Figs. 2 and 3) secured to the bodymaker main frame 12.

The extra advancement of the can body C while it is supported by the freely rotatable inside and outside support rollers 51, 52, is effected by a pair of rotatable respacing elements preferably comprising rollers or wheels 61 having on their outer peripheries segmental respacing projections or lugs 62 formed with outer curved faces 63 of a predetermined circumferential length for engagement with the outer surface of the advancing can body C. One of these wheels 61 is disposed on each side of the horn section 35, outside of the horn section, and directly opposite the second or intermediate inside support roller 51 as shown in Fig. 5. The wheels 61 are located in laterally spaced relation to the adjacent support rollers 51 so that only the curved faces 63 of the segmental lugs 62 frictionally engage the outside surfaces of the bodies during rotation of the wheels.

The respacing wheels 61 are mounted on the upper ends of a pair of vertical shafts 65 (Figs. 3 and 4) journaled in vertical bearings 66 formed in the bracket 59. The lower ends of the shafts 65 carry bevel gears 67 which mesh with bevel gears 68 in such a manner as to drive the wheels 61 in the same direction as the travel of the advancing can body and at a peripheral speed substantially the same as or slightly greater than the linear speed of the body. The gears 68 are mounted on a crossshaft 69 which is journaled in bearings 71 formed in the bracket 59. The shaft 69 is continuously rotated by an endless chain 72 (Figs. 1 and 2) which operates over a sprocket 73 on the shaft 69 and over a driving sprocket 74 on the main drive shaft 33. Through this connection the respacing wheels 61 are rotated in time with the reciprocation of the feed bars 13, 14 and thus in time with the advancement of the can body.

Hence during the advancement of the can body upon the forward or feeding stroke of the feed bars 13, 14 the rotating respacing wheels 61 are clear of the body as shown in Fig. 7. When the feed bars 13, 14 reach the end of their stroke, the curved faces 63 of the respacing wheels 61 engage the outer surface of the body on opposite sides of the horn support 35 as shown in Fig. 5 and thus squeeze the body side wall between the curved faces 63 and the adjacent inner support rollers 51, the latter acting as backing up or pressure rollers. As the respacing wheels 61 continue to rotate they frictionally advance the body the extra distance to create the wide space L hereinbefore mentioned which is controlled by the length of the curved faces 63 as shown in Fig. 6. This advancement of the body takes place while the feed bars 13, 14 move back through their return stroke.

In order to maintain the increased space L between the advanced body and the next following body during transfer of the advanced body into proper position adjacent the soldering attachment conveyor 41, the reciprocating feed bars 14 are provided with spring pressed retractable auxiliary feed fingers 76 (Figs. 4, 5, 6 and 7) which preferably are the last feed fingers on the feed bars. These feed fingers 76 are similar to the feed fingers 16 but are spaced relative to the next preceding feed fingers 16 a greater distance sufficient to compensate for the increased space L between bodies. These feed fingers 76 upon movement of the feed bars 13, 14 move through the same distance as the feed fingers 16 but are always in advance of the preceding fingers 16 by a distance which compensates for the increased space L between bodies.

Thus upon a return stroke of the feed bars 13, 14

(toward the left as viewed in Figs. 1, 4 and 5) the feed fingers 76 are carried back a distance sufficient to snap up in back of the advanced or respaced body C as shown in Fig. 7 while the next preceding feed fingers 16, although carried back the same distance, snap up in back of the next preceding regular spaced body C. Upon the forward stroke of the feed bars 13, 14 (toward the right as shown in Figs. 1, 4 and 5) the feed fingers 76 advance the respaced body C into position adjacent the soldering attachment conveyor 41 as shown in Fig. 4 with the space L between it and the next preceding body providing sufficient space to permit the gripper dogs 42 to move through the space and into the positioned can body to properly grip it in the usual manner for further advancement through the outside horse 36.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. In a machine for making can bodies, the combination of a horn for supporting a plurality of can bodies arranged in spaced and timed processional order, said horn having a cross-sectionally reduced transfer support section, a feeding device for propelling the procession of can bodies along said horn, a segmental lug disposed adjacent the path of travel of said can bodies and rotatable into frictional engagement with the outer surface of said advancing can bodies individually for advancing each body an extra distance, a plurality of rotatable inside support rollers mounted in the transfer support section of said horn for engaging the inner surfaces of said advancing can bodies to support them for free and easy travel along said support section at least one of said inside rollers being disposed in body supporting relation opposite said lug, a plurality of rotatable outside support rollers disposed adjacent the remainder of said inside rollers and outside of said horn for engagement with the outer surface of said bodies and cooperation with said inside rollers in freely supporting and retaining each of said bodies in uniform relation to the path of said segmental lug thereby to assure uniformity of feeding by the lug, a receiving conveyor disposed in overlapping relation to said feeding device for receiving said can bodies individually from said feeding device and lug for further advancement, and means for rotating said segmental lug in time with said feeding device for advancing said can bodies individually said extra distance for increasing the space between adjacent can bodies preparatory to reception of a respaced can body by said receiving conveyor.

2. In a machine for making can bodies, the combination of a horn for supporting a plurality of can bodies arranged in spaced and timed processional order, a reciprocatable feed bar having a plurality of equally spaced feed fingers extending along said horn and terminating at a transfer station, said feed bar at said transfer station having an auxiliary feed finger spaced relative to its preceding feed finger a greater distance than the spacing between said other feed fingers, means for reciprocating said feed bar through a feeding stroke and a return stroke, an outside horse disposed in overlapping relation to said horn at said transfer station, a continuously operating receiving conveyor disposed adjacent said outside horse in overlapping relation to said feed bar, said conveyor having spaced gripper dogs for gripping said can bodies at said transfer station for further advancement, a segmental lug disposed adjacent said transfer station and rotatable into frictional engagement with the outer surface of an advancing can body at said transfer station, and means for rotating said segmental lug in time with the reciprocation of said feed bar for advancing said engaged body an extra distance for engagement by said auxiliary feed finger to increase the space between adjacent can bodies to facilitate entrance of said gripper dogs into the space between said respaced bodies for advancement along said outside horse.

3. In a machine for making can bodies, the combination of a horn for supporting a plurality of can bodies, feeding means for propelling a procession of said can bodies thereon in spaced and timed order along said horn, a rotatable segmental respacing lug disposed adjacent said feeding means and the path of travel of said bodies for successively frictionally engaging and advancing said bodies an extra distance, and means for rotating said segmental lug in time with said feeding device for advancing said can bodies individually said extra distance and thereby increasing the space between adjacent can bodies on said feeding means.

4. The combination of claim 3 wherein a pair of said respacing lugs are located on opposite sides of said horn each of said lugs having a curved face of a predetermined circumferential length frictionally engageable with the outer surface of a can body for increasing the space between the can bodies.

5. The combination of claim 3 including a backing up roller rotatably mounted in said horn opposite said segmental lug for supporting the inner surface of each body as it is engaged by the segmental lug and for minimizing friction to prevent abrasion of the body during its advancement by said lug.

6. The combination of claim 3 wherein said feeding means comprises fingers for engaging and advancing said bodies along the horn in spaced and processional order and includes at least one auxiliary finger adjacent said lug and spaced from the next preceding finger a distance greater than the distance between the next preceding pair of longitudinally spaced fingers whereby said auxiliary finger receives each can body after respacing by said lug for further advancement in respaced position.

References Cited in the file of this patent

UNITED STATES PATENTS

| 2,203,403 | Cameron | June 4, 1940 |
| 2,322,221 | Cereghins | June 22, 1943 |
| 2,332,672 | Schmitt | Oct. 26, 1943 |